United States Patent

Takaichi et al.

[11] Patent Number: 5,830,523
[45] Date of Patent: Nov. 3, 1998

[54] LOW-CALORIE BEVERAGE COMPOSITION

[75] Inventors: Akihisa Takaichi, Naruto; Ryuichi Hatai, Tokushima, both of Japan

[73] Assignee: Otsuka Pharmaceutical Co., Ltd., Tokyo, Japan

[21] Appl. No.: 711,305

[22] Filed: Sep. 3, 1996

Related U.S. Application Data

[63] Continuation of Ser. No. 552,172, Nov. 2, 1995, abandoned, which is a continuation of Ser. No. 267,305, Jun. 29, 1994, abandoned, which is a continuation of Ser. No. 71,044, Jun. 2, 1993, abandoned, which is a continuation of Ser. No. 773,869, filed as PCT/JP91/00241, Feb. 25, 1991, published as WO91/12733, Sep. 5, 1991, abandoned.

[30] Foreign Application Priority Data

Feb. 28, 1990 [JP] Japan ................................ 2-050414

[51] Int. Cl.$^6$ ........................................... A23L 1/236
[52] U.S. Cl. ............................... 426/548; 426/590
[58] Field of Search ...................... 426/548, 590

[56] References Cited

U.S. PATENT DOCUMENTS 4,738,856 4/1988 Clark ................... 426/590 X

FOREIGN PATENT DOCUMENTS 0044116 1/1982 European Pat. Off. .
0246177 11/1987 European Pat. Off. .
189672 11/1982 Japan .
5718967 11/1982 Japan .

OTHER PUBLICATIONS

WPI, File Supplier, Accession No. 80–50887C [29], Derwent Publications Ltd, London, GB; & JP–A–55 074 778 (J. Ogata) 06–06–1980.
WPI, File Supplier, Accession No. 77–33728Y [19], Derwent Publications Ltd, London, GB; & JP–A–52 041 275 (Ajinomoto K.K.) 30–03–1977.
L. O'Brien Nabors et al.: "Alternative sweeteners", 1986, Marcel Dekker, Inc., New York, US Chapter 14: Stevioside; pp. 298, 301, 302.
Chemical Abstracts 193026z (1976).
Chemical Abstracts 196435m (1983).
Chemical Abstracts 163174h (1976).
Chemical Abstracts 150474e (1979).
Chemical Abstracts 6373r (1980).
Chemical Abstracts 213747f (1985).
Chemical Abstracts 219832f (1985).

*Primary Examiner*—Leslie Wong
*Attorney, Agent, or Firm*—Sughrue, Mion, Zinn, Macpeak & Seas, PLLC

[57] ABSTRACT

A low-calorie beverage composition containing an inorganic electrolyte component and an organic acid component, the composition being characterized by containing a stevia extract as a sweetener amount of 2 to 15 mg per mEq/l of inorganic electrolyte cation.

9 Claims, No Drawings

LOW-CALORIE BEVERAGE COMPOSITION

This is a Continuation application of prior Parent application Ser. No. 08/552,172, filed on Nov. 2, 1995, now abandoned; which in turn is a Continuation of application Ser. No. 08/267,305, filed Jun. 29, 1994, now abandoned; which in turn is a Continuation of application Ser. No. 08/071,044, filed Jun. 2, 1993, now abandoned; which in turn is a Continuation of application Ser. No. 07/773,869, filed Oct. 25, 1991, now abandoned which is the National Stage filing of PCT/JP91/00241 filed on Feb. 25, 1991.

1. Field of the Invention

The present invention relates to a low-calorie beverage composition, and more particularly to a low-calorie beverage composition containing an inorganic electrolyte component and an organic acid component.

2. Background Art

Low-calorie drinks for sports are known as beverage compositions for making up for the water and the electrolyte lost by sweating in sports and the like. This kind of low-calorie beverage compositions contain an inorganic electrolyte, or inorganic and organic electrolytes to compensate for the cations of Na, K, Mg, Ca and the like and the anions such as Cl and phosphate ions, all released by sweating. However, if the inorganic electrolyte is supplied in an amount sufficient to compensate for the cations and/or anions depleted, the resulting beverage is given an undesirable taste such as bitter taste, harsh taste, astringent taste or the like, and leaves a bad taste in one's mouth when taken. A sweetener is used to avoid such undesirable aftertaste. While natural saccharides, e.g. sugar are the most preferred sweeteners in terms of taste, an excessive supply of natural saccharide results in superfluity of calorie. Therefore a synthetic sweetener is usually used conjointly with sugar or like saccharide to reduce the calorie so that a low-calorie beverage composition is obtained.

Synthetic sweeteners heretofore used, for example, aspartame, saccharine, etc. are inferior in the quality of sweet taste to natural saccharides and, after addition, impair the taste stability of the beverage, deteriorating the taste thereof in a few months. Moreover, because of the foregoing drawback of synthetic sweeteners, the amount of natural saccharide can not be sufficiently reduced, and the natural saccharide must be used currently in excess of specified quantity. For this reason, the calorie of a beverage can not be diminished to a level sufficient to meet the demand from the youth, and the problem of osmotic pressure increasing due to the saccharide used can not be obviated so that difficulty tends to be entailed in decreasing the osmotic pressure to about 160 to about 300 (mosmol) considered to be the optimum in view of absorbency.

DISCLOSURE OF THE INVENTION

An object of the present invention is to provide a low-calorie beverage composition free of the foregoing problems, the composition leaving no bad taste due to the inorganic electrolyte when taken and having a good flavor which facilitates drinking, and the composition being capable of retaining the good taste over a prolonged period of time without deteriorating the taste stability. Another object of the invention is to provide a low-calorie beverage composition which can eliminate the need to use a natural saccharide or can satisfactorily reduce the amount thereof and which has a properly low osmotic pressure at which a high absorption is attained.

According to the invention, there is provided a low-calorie beverage composition comprising an inorganic electrolyte component and an organic acid component, the composition being characterized by containing a stevia extract as a sweetener in an amount of 2 to 15 mg per mEq/l of inorganic electrolyte cation.

Our research revealed that when a stevia extract is used as a sweetener in an amount of 2 to 15 mg per mEq/l of inorganic electrolyte cation, the obtained beverage composition is entirely free of bad aftertaste such as bitter taste, astringent taste, harsh taste or the like due to the inorganic electrolyte cation and is palatable, easy to take and capable of retaining the good taste over a long period of time without having a taste stability adversely affected. Moreover, according to the present invention, the use of natural saccharide can be eliminated or can be significantly decreased so that the calorie of the composition is sufficiently lowered and that the osmotic pressure of the composition can be in the range of 150 to 350 (mosmol) in which a high absorption is attained.

The inorganic electrolyte component is incorporated into the low-calorie beverage composition of the present invention to make up for inorganic electrolyte cations and anions depleted by sweating. The inorganic electrolyte component is incorporated as an inorganic electrolyte or as a combination of inorganic electrolyte and organic electrolyte. The inorganic electrolyte component for use in the invention can be any of various inorganic electrolytes heretofore used for this kind of compositions. Examples of such conventional inorganic electrolytes are salts of inorganic acids with alkali metals or alkaline-earth metals such as NaCl, KCl, $MgCl_2$, $MgCO_3$, $CaCl_2$, $CaSO_4$, $Na_2SO_4$, $K_3PO_4$, $Ca_3[PO_4]_2$, $K_2HPO_4$, $KH_2PO_4$, $CaHPO_4$, etc. These salts are usually used in combination, and usually a sodium salt and a potassium salt are used in combination with a magnesium salt and/or a calcium salt. The foregoing inorganic electrolyte component is used in the form of a suitable salt of inorganic acid in view of supplementation of chlorine ions, phosphate ions and the like as inorganic electrolyte anions together with inorganic electrolyte cations. The inorganic electrolyte cation can be provided not only as the inorganic electrolyte but in the form of a salt of organic acid. Examples of useful salts of organic acids are salts of citric acid, lactic acid, L-glutamic acid, succinic acid, aspartic acid, alginic acid, malic acid, gluconic acid, etc. More specific examples are sodium citrate, calcium citrate, sodium lactate, calcium lactate, sodium succinate, disodium succinate, sodium L-glutamate, sodium aspartate, calcium aspartate, sodium alginate, sodium malate, calcium gluconate, etc.

The inorganic and/or organic electrolyte component is used in an amount sufficient to make up for inorganic electrolyte cations and anions lost by sweating. The amount of such component to be used is variable over a wide range which corresponds to the conventional range for this kind of beverage compositions. A suitable amount is, per 1000 ml of the beverage composition, preferably about 10 to about 40 mEq, more preferably about 20 to about 30 mEq in terms of inorganic cation, or about 10 to about 25 mEq in terms of inorganic anion.

The organic acid component in the beverage composition of the invention can be used in the form of the foregoing inorganic electrolyte component and/or a free acid. Examples of useful organic acids include the acids exemplified above for the organic electrolyte component. The amount of the organic acid component used is not specifically limited, and may be in the range which is conventionally available for this kind of beverage compositions, or may be less or more than the conventional range when so required. A preferred amount is 1.3 to 2.5 g per 1000 ml of the beverage composition.

It is essential in the invention to use a stevia extract as a sweetener, along with the inorganic electrolyte component and the organic acid component. The stevia extract is a sweetener extracted from a stevia, i.e. a perennial plant which is a genus of Compositae family. This extract is per se known, as disclosed e.g. in Japanese Unexamined Patent Publication No.83731/1977 and Japanese Examined Patent Publication No.56628/1983. However, no report has been made on the incorporation of such sweetener in a low-calorie beverage composition containing an inorganic electrolyte component. It is entirely unknown that the foregoing remarkable effect can be achieved by using the above sweetener in an amount specified based on the inorganic electrolyte component. A variety of conventional stevia extracts can be used in the invention. Preferred stevia extracts include, for example, rebaudioside A, rebaudioside B, rebaudioside C, rebaudioside D, rebaudioside E and glycosylstevioside. Usually the stevia extract can be produced as a mixture of substances. It is suitable in this invention to use a stevia extract containing preferably at least about 50% by weight, more preferably at least about 80% by weight, of rebaudioside A.

In the invention, the stevia extract is critically used in an amount of 2 to 15 mg per mEq/l of inorganic electrolyte cation. The stevia extract used in the above amount prevents the undesired aftertaste from occurring due to the inorganic electrolyte cation. A preferred amount is 2.5 to 10 mg per mEq/l of inorganic electrolyte cation.

The use of the stevia extract in the invention can eliminate the need to use the natural saccharide component or can reduce the amount thereof to a pronounced extent, whereby a satisfactory decrease of calorie is induced and the undesired increase of osmotic pressure can be avoided so that a beverage composition can be easily imparted an osmotic pressure at which a high absorption is attained. It is suitable that the composition of the invention give a low calorie, specifically 12 kcal or less, or preferably 10 kcal or less, per 100 ml of its portion and have an osmotic pressure of 150 to 350 (mosmol), preferably 160 to 300 (mosmol), more preferably 200 to 270 (mosmol). The amount of the saccharide component to be used is suitably determined in consideration of the foregoing calorie and osmotic pressure, and is usually in the range of 30 g or less, preferably 27 g or less, per 1000 ml of the beverage composition. Examples of the saccharide component for use herein include those commonly used for this kind of compositions such as sugar, glucose, fructose, etc.

When required, the beverage composition of the invention may contain, in addition to the above components, at least one component selected from the group consisting of juices (concentrated juices) of grapefruits, apples, oranges, lemons, pineapples, bananas, pears and the like; vitamins, spices, amino acids (e.g. sodium glutaminate, glycine, alanine, sodium asparate, etc.), vegetable fibers (e.g. polydextrose, pectin, xanthan gum, gum arabic, alginic acid, etc.), seasonings (e.g. glutamic acid, inosinic acid, etc.), oligosaccharides, etc.

EXAMPLES

The present invention will be described below in more detail with reference to the following examples.

Examples 1 to 6

Compositions of the present invention were prepared using the ingredients as shown below in Table 1 in the listed amounts.

TABLE 1

| Example No. | | 1 | 2 | 3 | 4 | 5 | 6 |
|---|---|---|---|---|---|---|---|
| Cation (mEq/l) | $Na^+$ | 21 | 15 | 21 | 15 | 8 | 27 |
| | $K^+$ | 5 | 5 | 5 | 5 | 4 | 5 |
| | $Ca^{++}$ | 1 | 1 | 1 | 2 | 1 | 1 |
| | $Mg^{++}$ | 0.5 | 0.5 | 0.5 | 0.5 | 0.5 | 0.5 |
| | Total | 27.5 | 21.5 | 27.5 | 22.5 | 13.5 | 33.5 |
| Anion (mEq/l) | $Cl^-$ | 16.5 | 10.5 | 16.5 | 10.5 | 6.5 | 17.5 |
| | citrate$^{---}$ | 10 | 10 | 8 | 10 | 4 | 11 |
| | lactate$^-$ | 1 | 1 | 1 | 2 | 1 | 1 |
| | tartarate$^{--}$ | 0 | 0 | 1 | 0 | 1 | 2 |
| | malate$^{--}$ | 0 | 0 | 1 | 0 | 1 | 2 |
| | Total | 27.5 | 21.5 | 27.5 | 22.5 | 13.5 | 33.5 |
| Rebaudioside A (mg/l) | | 80 | 75 | 83 | 73 | 70 | 85 |
| Saccharide | Fructose (g/l) | 20 | 18 | 17 | 16 | 15 | 22 |
| | Dextrose (g/l) | 2 | 1 | 2 | 3 | 2 | 1 |
| | Sucrose (g/l) | 4 | 5 | 5 | 6 | 4 | 4 |

Test for taste

The beverage composition of the present invention obtained in Example 1 (Beverage-1 of the invention) and a beverage (Comparison beverage-1) prepared in the same manner as in Example 1 with the exception of using 120 mg/1000 ml of aspartame in place of rebaudioside A were each given to 10 judges for comparison. Table 2 shows the results.

TABLE 2

| | Beverage-1 of the invention | Comparison beverage-1 |
|---|---|---|
| Bitter taste | B | B |
| Astringent taste | B | B |
| Aftertaste | A | C |
| Quality of sweet taste | A | B |
| Overall evaluation | A | B |

A: Not less than 9 of the 10 judges rated the beverage as satisfactory.
B: Six to eight of the 10 judges rated the beverage as satisfactory.
C: Three to five of the 10 judges rated the beverage as satisfactory.
D: Not more than 2 of the 10 judges rated the beverage as satisfactory.

The above results show that the beverage of the present invention is outstanding in aftertaste and overall evaluation when compared with conventional sweeteners.

Test for storage stability

After the beverage-1 of the invention and the comparison beverage-1 were stored at 30° C. for 3 months, the foregoing test for taste was carried out with the results shown below in Table 3.

TABLE 3

| | Beverage-1 of the invention | Comparison beverage-1 |
|---|---|---|
| Bitter taste | B | C |
| Astringent taste | B | C |
| Aftertaste | A | D |
| Quality of sweet taste | A | C |
| Overall evaluation | A | C |

The beverage of the present invention exhibited little change in its taste when stored for a prolonged period of time and is thus excellent in storage stability.

We claim:

1. A low-calorie beverage composition comprising 10 to 40 mEq/1000 ml of an inorganic electrolyte component and 1.3 to 2.5 g/1000 ml of an organic acid component, wherein the composition contains a stevia extract as a sweetener in an amount of 2 to 15 mg per mEq/1000 ml of the inorganic electrolyte cation, and wherein said stevia extract contains at least 80% by weight of rebaudioside A.

2. A beverage composition according to claim 1 which has an osmotic pressure of 150 to 350 (mosmol).

3. A beverage composition according to claim 2 which has an osmotic pressure of 160 to 300 (mosmol).

4. A beverage composition according to claim 1 which contains 20 to 30 mEq/1000 ml of inorganic electrolyte cation.

5. A beverage composition according to claim 1 which gives 12 kcal or less per 100 ml of its portion.

6. A beverage composition according to claim 1 which contains 30 g/1000 ml or less of a saccharide component.

7. A beverage composition according to claim 1 which contains 10 to 25 mEq/1000 ml of inorganic electrolyte anion.

8. A beverage composition according to claim 6 which contains 10 to 25 mEq/1000 ml of inorganic electrolyte anion.

9. A beverage composition according to claim 6 which contains 2.5 to 10 mg of the stevia extract per mEq/1000 ml of inorganic electrolyte cation.

* * * * *